(12) United States Patent
Mahieux et al.

(10) Patent No.: US 9,328,309 B2
(45) Date of Patent: May 3, 2016

(54) SOLVENT EXTRACTION FOR PREPARING A SALT OF A SULFURIZED ALKYL-SUBSTITUTED HYDROXYAROMATIC COMPOSITION

(71) Applicants: Cedrick Mahieux, Vallejo, CA (US); Richard Pran Dutta, El Sobrante, CA (US); Curtis B. Campbell, Contra Costa, CA (US); Benjamin David Yip, Fremont, CA (US)

(72) Inventors: Cedrick Mahieux, Vallejo, CA (US); Richard Pran Dutta, El Sobrante, CA (US); Curtis B. Campbell, Contra Costa, CA (US); Benjamin David Yip, Fremont, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 0 days.

(21) Appl. No.: 14/081,191

(22) Filed: Nov. 15, 2013

(65) Prior Publication Data

US 2014/0142015 A1 May 22, 2014

Related U.S. Application Data

(60) Provisional application No. 61/728,470, filed on Nov. 20, 2012.

(51) Int. Cl.
*C10M 177/00* (2006.01)
*C10M 135/02* (2006.01)

(52) U.S. Cl.
CPC ........... *C10M 135/02* (2013.01); *C10M 177/00* (2013.01); *C10M 2219/02* (2013.01); *C10N 2230/64* (2013.01)

(58) Field of Classification Search
USPC ................................. 508/572, 574
See application file for complete search history.

(56) References Cited

U.S. PATENT DOCUMENTS

| | | | |
|---|---|---|---|
| 4,169,799 A | 10/1979 | Sung et al. | |
| 4,328,111 A | 5/1982 | Watson et al. | |
| 4,744,921 A | 5/1988 | Liston | |
| 5,616,816 A * | 4/1997 | Burjes et al. | 568/727 |
| 8,772,209 B2 * | 7/2014 | Mahieux et al. | 508/574 |
| 2008/0070818 A1 | 3/2008 | Arrowsmith et al. | |
| 2009/0143264 A1 | 6/2009 | Harrison et al. | |
| 2013/0165359 A1 * | 6/2013 | Gibbs et al. | 508/561 |

* cited by examiner

*Primary Examiner* — Sudhakar Katakam
*Assistant Examiner* — Pancham Bakshi
(74) *Attorney, Agent, or Firm* — M. Carmen & Associates, PLLC

(57) ABSTRACT

Disclosed is a process for preparing a salt of a sulfurized alkyl-substituted hydroxyaromatic composition having a reduced content of unsulfurized alkyl-substituted hydroxyaromatic compound and its unsulfurized metal salt. The process involves at least the steps of: (a) providing a composition comprising (i) a salt of a sulfurized alkyl-substituted hydroxyaromatic compound; (ii) an unsulfurized alkyl-substituted hydroxyaromatic compound and (iii) an unsulfurized metal salt of the alkyl-substituted hydroxyaromatic compound; wherein the alkyl-substituted hydroxyaromatic compound is derived from alkylation of a hydroxyaromatic compound with one or more olefins comprising $C_9$ to $C_{18}$ oligomers of monomers selected from propylene, butylene or mixtures thereof; and (b) extracting the unsulfurized alkyl-substituted hydroxyaromatic compound and its unsulfurized metal salt from the composition of step (a) with one or more solvents capable of solubilizing the unsulfurized alkyl-substituted hydroxyaromatic compound and its unsulfurized metal salt and under extraction conditions sufficient to provide a salt of a sulfurized alkyl-substituted hydroxyaromatic composition having a reduced content of unsulfurized alkyl-substituted hydroxyaromatic compound and its unsulfurized metal salt.

20 Claims, No Drawings

SOLVENT EXTRACTION FOR PREPARING A SALT OF A SULFURIZED ALKYL-SUBSTITUTED HYDROXYAROMATIC COMPOSITION

PRIORITY

This application claims the benefit under 35 U.S.C. §119 to U.S. Provisional Patent Application No. 61/728,470, filed on Nov. 20, 2012, the contents of which are incorporated by reference herein.

BACKGROUND OF THE INVENTION

1. Technical Field

The present invention generally relates to a solvent extraction method for preparing a salt of a sulfurized alkyl-substituted hydroxyaromatic composition having a reduced content of unsulfurized alkyl-substituted hydroxyaromatic compound and its unsulfurized metal salt.

2. Description of the Related Art

The lubricant additive industry generally uses alkyl phenols (e.g., tetrapropenyl phenol, TPP) to prepare detergents comprising sulfurized metal alkyl phenates. Metal salts of sulfurized alkylphenols are useful lubricating oil additives which impart detergency and dispersancy properties to the lubricating oil composition for marine, automotive, railroad and air-cooled engines as well as providing for an alkalinity reserve in the oil. Alkalinity reserve is necessary in order to neutralize acids generated during engine operation. Without this alkalinity reserve, the acids so generated would result in harmful engine corrosion. However, there may be some unreacted alkyl phenols such as tetrapropenyl phenol present in the sulfurized metal alkyl phenate as well as in lubricating oils containing one or more of the sulfurized metal alkyl phenates.

A recent reproductive toxicity study in rats sponsored by the Petroleum Additives Panel of the American Chemistry Council shows that free or unreacted TPP may cause adverse effects on male and female reproductive organs. Further, it is believed that TPP may be corrosive or irritating to the skin.

U.S. Patent Application Publication No. 20080070818 ("the '818 publication") discloses a lubricating oil composition including at least one sulfurized overbased metal phenate detergent prepared from a $C_9$-$C_{15}$ alkyl phenol, at least one sulfurized agent, at least one metal and at least one overbasing agent; the detergent including less than 6.0% by combined mass of unsulfurized $C_1$-$C_{15}$ alkyl phenol and unsulfurized metal salts thereof. Examples A and B disclosed in the '818 publication obtained an overbased detergent having 5.58 and 3.84 mass %, respectively, of unsulfurized alkyl phenol and its unsulfurized calcium salt.

U.S. Patent Application Publication No. 20090143264 ("the '264 publication") discloses sulfurized metal alkyl phenate compositions having a low alkyl phenol content. The sulfurized metal alkyl phenate compositions of the '264 publication can be prepared by reacting a phenol compound such as tetrapropenyl phenol with an aldehyde to form a phenolic resin and then reacting the phenolic resin simultaneously with a metal base and a first sulfurizing agent.

U.S. Pat. No. 4,328,111 ("the '111 patent") discloses that overbased phenates, including sulfurized phenates are commonly manufactured in the presence of ethylene glycol which is difficult to remove from the product, thereby wasting raw materials and sometimes leading to undesirable side effects from glycol in the final product. The '111 patent further discloses that in order to remove ethylene glycol, an acidic compound is reacted with a basic compound comprising an overbased metal sulfonate, phenate, or mixtures thereof, and the reaction product is then nitrogen stripped to remove the ethylene glycol.

To reduce any potential health risks to customers and to avoid potential regulatory issues, there is a need to reduce the amount of free unsulfurized alkyl-substituted hydroxyaromatic compound and its metal salt in the salt of a sulfurized alkyl-substituted hydroxyaromatic composition in a simple, cost efficient manner. Accordingly, it is desirable to provide an improved process for preparing a salt of a sulfurized alkyl-substituted hydroxyaromatic composition which has relatively low levels of unsulfurized alkyl-substituted hydroxyaromatic compound and its metal salt.

SUMMARY OF THE INVENTION

In accordance with one embodiment of the present invention, there is provided a process for preparing a salt of a sulfurized alkyl-substituted hydroxyaromatic composition having a reduced content of unsulfurized alkyl-substituted hydroxyaromatic compound and its unsulfurized metal salt, the process comprising the steps of:

(a) providing a composition comprising (i) a salt of a sulfurized alkyl-substituted hydroxyaromatic compound; (ii) an unsulfurized alkyl-substituted hydroxyaromatic compound and (iii) an unsulfurized metal salt of the alkyl-substituted hydroxyaromatic compound; wherein the alkyl-substituted hydroxyaromatic compound is derived from alkylation of a hydroxyaromatic compound with one or more olefins comprising $C_9$ to $C_{18}$ oligomers of monomers selected from propylene, butylene or mixtures thereof; and (b) extracting the unsulfurized alkyl-substituted hydroxyaromatic compound and its unsulfurized metal salt from the composition of step (a) with one or more solvents capable of solubilizing the unsulfurized alkyl-substituted hydroxyaromatic compound and its unsulfurized metal salt and under extraction conditions sufficient to provide a salt of a sulfurized alkyl-substituted hydroxyaromatic composition having a reduced content of unsulfurized alkyl-substituted hydroxyaromatic compound and its unsulfurized metal salt.

In accordance with one embodiment of the present invention, there is provided a process for preparing a salt of a sulfurized alkyl-substituted hydroxyaromatic composition having a reduced content of unsulfurized alkyl-substituted hydroxyaromatic compound and its unsulfurized metal salt, the process comprising the steps of:

(a) providing a composition comprising (i) a salt of a sulfurized alkyl-substituted hydroxyaromatic compound; (ii) an unsulfurized alkyl-substituted hydroxyaromatic compound and (iii) an unsulfurized metal salt of the alkyl-substituted hydroxyaromatic compound; wherein the alkyl-substituted hydroxyaromatic compound is derived from alkylation of a hydroxyaromatic compound with one or more olefins comprising $C_9$ to $C_{18}$ oligomers of monomers selected from propylene, butylene or mixtures thereof; and (b) extracting the unsulfurized alkyl-substituted hydroxyaromatic compound and its unsulfurized metal salt from the composition of step (a) with one or more solvents capable of solubilizing the unsulfurized alkyl-substituted hydroxyaromatic compound and its unsulfurized metal salt and under extraction conditions sufficient to provide a salt of a sulfurized alkyl-substituted hydroxyaromatic composition having less than about 1.5 wt. % of the unsulfurized alkyl-substituted hydroxyaromatic compound and its unsulfurized metal salt.

The process of the present invention advantageously provides a salt of a sulfurized alkyl-substituted hydroxyaromatic composition containing relatively low levels of unsulfurized alkyl-substituted hydroxyaromatic compound and its unsulfurized metal salt that can be prepared in a simple, cost efficient manner. This is an unexpected improvement in that the presence of the unsulfurized alkyl-substituted hydroxyaromatic compound and its unsulfured metal salt in a salt of a sulfurized alkyl-substituted hydroxyaromatic composition is undesirable because of their deleterious estrogenic behavior and there is a growing concern of their potential release into the environment.

DETAILED DESCRIPTION OF THE PREFERRED EMBODIMENTS

Prior to discussing the invention in further detail, the following terms will be defined:

DEFINITIONS

As used herein, the following terms have the following meanings, unless expressly stated to the contrary:

The term "Total Base Number" or "TBN" as used herein refers to the amount of base equivalent to milligrams of KOH in 1 gram of sample. Thus, higher TBN numbers reflect more alkaline products, and therefore a greater alkalinity reserve. The TBN of a sample can be determined by ASTM Test No. D2896-11 issued May 15, 2011 or any other equivalent procedure.

The term "phenate" means a metal salt of a phenol.

The term "alkylphenate" means a metal salt of an alkylphenol.

The term "alkylphenol" means a phenol having one or more alkyl substituents, wherein at least one of the alkyl substituents has a sufficient number of carbon atoms to impart oil solubility to the phenol.

The term "lime" refers to calcium hydroxide, also known as slaked lime or hydrated lime.

The term "metal" means alkali metals, alkaline earth metals, or mixtures thereof.

The term "alkaline earth metal" refers to calcium, barium, magnesium, and strontium.

The term "alkali metal" refers to lithium, sodium, potassium, rubidium, and cesium.

The term "metal base" refers to a metal hydroxide, metal oxide, metal alkoxides and the like and mixtures thereof, wherein the metal is an alkaline earth metal or alkali metal.

The term "overbased" refers to a class of metal salts or complexes. These materials have also been referred to as "basic", "superbased", "hyperbased", "complexes", "metal complexes", "high-metal containing salts", and the like. Overbased products are metal salts or complexes characterized by a metal content in excess of that which would be present according to the stoichiometry of the metal and the particular acidic organic compound reacted with the metal, e.g., a carboxylic acid. Suitable overbasing metals include alkaline earth metals such as magnesium, calcium, barium, and strontium. Suitable overbasing metals can be provided from the corresponding metal hydroxides, for example, calcium hydroxide and magnesium hydroxide provide the source for the alkaline earth metals calcium and magnesium, respectively. Additional overbasing can be achieved by the addition of acidic overbasing compounds for example, carbon dioxide and boric acid.

The terms "alkenyl succinic acid or anhydride" and "alkyl succinic acid or anhydride" may be used interchangeably.

The present invention is directed to a process for preparing a salt of a sulfurized alkyl-substituted hydroxyaromatic composition having a reduced content of unsulfurized alkyl-substituted hydroxyaromatic compound and its unsulfurized metal salt. In general, the process of the present invention includes the steps of (a) providing a composition comprising (i) a salt of a sulfurized alkyl-substituted hydroxyaromatic compound; (ii) an unsulfurized alkyl-substituted hydroxyaromatic compound and (iii) an unsulfurized metal salt of the alkyl-substituted hydroxyaromatic compound; wherein the alkyl-substituted hydroxyaromatic compound is derived from alkylation of a hydroxyaromatic compound with one or more olefins comprising $C_9$ to $C_{18}$ oligomers of monomers selected from propylene, butylene or mixtures thereof; and (b) extracting the unsulfurized alkyl-substituted hydroxyaromatic compound and its unsulfurized metal salt from the composition of step (a) with one or more solvents capable of solubilizing the unsulfurized alkyl-substituted hydroxyaromatic compound and its unsulfurized metal salt and under extraction conditions sufficient to provide a salt of a sulfurized alkyl-substituted hydroxyaromatic composition having a reduced content of unsulfurized alkyl-substituted hydroxyaromatic compound and its unsulfurized metal salt.

In step (a), a salt of a sulfurized alkyl-substituted hydroxyaromatic composition containing an unsulfurized alkyl-substituted hydroxyaromatic compound and its unsulfurized metal salt is provided. In general, the composition is obtained by (i) alkylating a hydroxyaromatic compound with one or more olefins comprising $C_9$ to $C_{18}$ oligomers of monomers selected from propylene, butylene or mixtures thereof, to provide an alkyl-substituted hydroxyaromatic compound; (ii) sulfurizing and neutralizing the alkyl-substituted hydroxyaromatic compound in any order to provide a salt of a sulfurized alkyl-substituted hydroxyaromatic composition; and (iii) optionally overbasing the salt of a sulfurized alkyl-substituted hydroxyaromatic composition. In one embodiment, the unsulfurized alkyl-substituted hydroxyaromatic compound is tetrapropenyl phenol. In certain embodiments, the tetrapropenyl phenol comprises a mixture of the isomers of tetrapropenyl phenol, such as a mixture of p-dodecylphenol, m-dodecylphenol and o-dodecylphenol.

The alkyl-substituted hydroxyaromatic compound employed in the present invention is prepared by methods that are well known in the art. Useful hydroxyaromatic compounds that may be alkylated include mononuclear monohydroxy and polyhydroxy aromatic hydrocarbons having 1 to 4, and preferably 1 to 3, hydroxyl groups. Suitable hydroxyaromatic compounds include phenol, catechol, resorcinol, hydroquinone, pyrogallol, cresol, and the like and mixtures thereof. In one embodiment, the hydroxyaromatic compound is a phenol.

The alkylating agent employed to alkylate the hydroxyaromatic compound includes one or more olefins comprising $C_9$ to $C_{18}$ oligomers of monomers selected from propylene, butylene or mixtures thereof. Generally, the one or more olefins will contain a major mount of the $C_9$ to $C_{18}$ oligomers of monomers selected from propylene, butylene or mixtures thereof. Examples of such olefins include propylene tetramer, butylene trimer and the like. As one skilled in the art will readily appreciate, other olefins may be present. For example, the other olefins that can be used in addition to the $C_9$ to $C_{18}$ oligomers include linear olefins, cyclic olefins, branched olefins other than propylene oligomers such as butylene or isobutylene oligomers, arylalkylenes and the like and mixtures thereof. Suitable linear olefins include 1-hexene, 1-nonene, 1-decene, 1-dodecene and the like and mixtures thereof. Especially suitable linear olefins are high molecular weight normal alpha-olefins such as $C_{16}$ to $C_{30}$ normal alpha-olefins, which can be obtained from processes such as ethylene oligomerization or wax cracking. Suitable cyclic olefins include cyclohexene, cyclopentene, cyclooctene and the like and mixtures thereof. Suitable branched olefins include butylene dimer or trimer or higher molecular weight isobutylene oligomers, and the like and mixtures thereof. Suitable arylalkylenes include styrene, methyl styrene, 3-phenylpropene, 2-phenyl-2-butene and the like and mixtures thereof.

Alkylation of the hydroxyaromatic compound with the one or more olefins comprising $C_9$ to $C_{18}$ oligomers of monomers selected from propylene, butylene or mixtures thereof is generally carried out in the presence of an alkylation catalyst. Useful alkylation catalysts include acid catalysts, trifluoromethanesulfonic acid, and acidic molecular sieve catalysts. Representative examples of acid catalysts include, by way of example, Lewis acid catalysts, solid acid catalysts and the like and mixtures thereof.

Useful Lewis acid catalysts include, but are not limited to, aluminum trichloride, aluminum tribromide, aluminum triiodide, boron trifluoride, boron tribromide, boron triiodide and the like.

Useful solid acidic catalysts include, but are not limited to, zeolites, acid clays, and/or silica-alumina. The catalyst may be a molecular sieve. Eligible molecular sieves are silica-aluminophosphate molecular sieves or metal silica-aluminophosphate molecular sieves, in which the metal may be, for example, iron, cobalt or nickel. In one embodiment, a solid catalyst is a cation exchange resin in its acid form, for example, crosslinked sulfonic acid catalyst. Suitable sulfonated acidic ion exchange resin type catalysts include Amberlyst 36®, available from Rohm and Hass (Philadelphia, Pa.). The acid catalyst may be recycled or regenerated when used in a batch process or a continuous process.

The reaction conditions for the alkylation depend upon the type of catalyst used, and any suitable set of reaction conditions that result in high conversion to the alkylhydroxyaromatic product can be employed. In one embodiment, the reaction temperature for the alkylation reaction will be in the range of about 25° C. to about 200° C. In another embodiment, the reaction temperature for the alkylation reaction will be in the range of about 85° C. to about 135° C. The reaction pressure will generally be atmospheric, although higher or lower pressures may be employed. The alkylation process can be practiced in a batchwise, continuous or semi-continuous manner. In one embodiment, the molar ratio of the hydroxyaromatic compound to one or more olefins is in the range of about 10:1 to about 0.5:1. In another embodiment, the molar ratio of the hydroxyaromatic compound to one or more olefins is in the range of about 5:1 to about 3:1.

The alkylation reaction may be carried out neat or in the presence of a solvent which is inert to the reaction of the hydroxyaromatic compound and the olefin mixture. When employed, a typical solvent is hexane.

Upon completion of the reaction, the desired alkylhydroxyaromatic compound can be isolated using conventional techniques. Typically, excess hydroxyaromatic compound is distilled from the reaction product.

The alkyl group of the alkyl-substituted hydroxyaromatic compound is typically attached to the hydroxyaromatic compound primarily in the ortho and para positions, relative to the hydroxyl group.

The alkyl-substituted hydroxyaromatic compound is subsequently sulfurized and neutralized in any order to provide a salt of a sulfurized alkyl-substituted hydroxyaromatic composition. The sulfurization and neutralization steps can be performed in any order so as to provide the salt of the sulfurized alkyl-substituted hydroxyaromatic composition. Alternatively, the neutralization and sulfurization steps can be carried out simultaneously.

In general, sulfurization is carried out by contacting the alkyl-substituted hydroxyaromatic compound with a sulfur source which introduces $S_x$ bridging groups between alkyl-substituted hydroxyaromatic compounds, wherein x is 1 to 7, in the presence of a base. Any suitable sulfur source can be used such as, for example, elemental sulfur or a halide thereof such as sulphur monochloride or sulphur dichloride, hydrogen sulfide, sulfur dioxide and sodium sulfide hydrates. The sulfur can be employed either as molten sulfur or as a solid (e.g., powder or particulate) or as a solid suspension in a compatible hydrocarbon liquid.

The base catalyzes the reaction to incorporate sulfur onto the alkyl-substituted hydroxyaromatic compound. A suitable base includes, but is not limited to, NaOH, KOH, $Ca(OH)_2$ and the like and mixtures thereof.

The base is generally employed at from about 0.5 to about 5 moles per mole of the alkyl-substituted hydroxyaromatic compound in the reaction system. In one embodiment, the base is employed at from about 1 to about 1.5 moles per mole of the alkyl-substituted hydroxyaromatic compound in the reaction system. The base can be added to the reaction mixture as a solid or a liquid.

Sulfur is generally employed at from about 0.5 to about 4 moles per mole of the alkyl-substituted hydroxyaromatic compound in the reaction system. In one embodiment, sulfur is employed at from about 0.8 to 2 moles per mole of the alkyl-substituted hydroxyaromatic compound. In one embodiment, sulfur is employed at from about 1 to 1.5 moles per mole of alkyl-substituted hydroxyaromatic compound.

The temperature range in which the sulfurization reaction is carried out is generally from about 150° C. to about 200° C. In one embodiment, the temperature range is from about 160° C. to about 180° C. The reaction can be conducted under atmospheric pressure (or slightly lower) or at elevated pressures. In one embodiment the reaction is carried out under vacuum to facilitate $H_2S$ elimination. The exact pressure developed during the reaction is dependent upon such factors as the design and operation of the system, the reaction temperature, and the vapor pressure of the reactants and products and it may vary during the course of the reaction. In one embodiment, the process pressures are at atmospheric to about 20 mm Hg.

Neutralization of the sulfurized or unsulfurized alkyl-substituted hydroxyaromatic compound may be carried out in a continuous or batch process by any method known to a person skilled in the art. Numerous methods are known in the art to neutralize the sulfurized or unsulfurized alkyl-substituted hydroxyaromatic compounds and to produce basic phenates by incorporation of a source of base. In general, neutralization can be carried out by contacting the sulfurized or unsulfurized alkyl-substituted hydroxyaromatic compound with a metal base under reactive conditions, preferably in an inert-compatible liquid hydrocarbon diluent. If desired, the reaction can be conducted under an inert gas, typically nitrogen. The metal base may be added either in a single addition or in a plurality of additions at intermediate points during the reaction.

Suitable metal basic compounds include hydroxides, oxides or alkoxides of the metal such as (1) an alkali metal salt derived from a metal base selected from an alkali hydroxide, alkali oxide or an alkali alkoxide, or (2) an alkaline earth metal salt derived from a metal base selected from an alkaline earth hydroxide, alkaline earth oxide or alkaline earth alkoxide. Representative examples of metal basic compounds with hydroxide functionality include lithium hydroxide, potassium hydroxide, sodium hydroxide, magnesium hydroxide, calcium hydroxide, barium hydroxide, aluminum hydroxide and the like. Representative examples of metal basic compounds with oxide functionality include lithium oxide, magnesium oxide, calcium oxide, barium oxide and the like. In one embodiment, the alkaline earth metal base is slaked lime (calcium hydroxide), because of its handling convenience and cost versus, for example, calcium oxide.

Neutralization is typically conducted in a suitable solvent or diluents oil, such as toluene, xylene and commonly with a promoter such as an alcohol, e.g., a $C_1$ to $C_{16}$ alcohol, such as methanol, decyl alcohol, or 2-ethyl hexanol; a diol, e.g., $C_2$ to $C_4$ alkylene glycols, such as ethylene glycol; and/or carboxylic acids. Suitable diluent oils include naphthenic oils and mixed oils, e.g., paraffinic oils such as 100 neutral oil. The quantity of solvent or diluent oil used is such that the amount of solvent or oil in the final product constitutes from about 25% to about 65% by weight of the final product, preferably from about 30% to about 50%. For example, the source of alkaline earth metal is added in excess as a slurry (i.e., as a pre-mixture of source of an alkaline earth metal lime, solvent or diluent oil) and then reacted with the sulfurized or unsulfurized alkyl-substituted hydroxyaromatic compound.

The neutralization reaction between the metal base and the sulfurized or unsulfurized alkyl-substituted hydroxyaromatic compound is typically conducted at temperatures above room temperature (20° C.). In one embodiment, neutralization can be carried out at a temperature between about 20° C. and about 150° C. It is however preferred to carry the neutralization at low temperature. In one embodiment, neutralization can be carried out at a temperature of between about 25° C. and about 30° C. The neutralization reaction itself should take place for a period of time of from about 5 to about 60 minutes. If desired, the neutralization reaction is carried out in the presence of a promoter such as ethylene glycol, formic acid, acetic acid, and the like and mixtures thereof.

Upon completion of the sulfurizing and neutralizing of the alkyl-substituted hydroxyaromatic compound, a neutral salt of a sulfurized alkyl-substituted hydroxyaromatic composition is obtained. If desired, the neutral salt of a sulfurized alkyl-substituted hydroxyaromatic composition can be overbased to provide an overbased salt of a sulfurized alkyl-substituted hydroxyaromatic composition. Overbasing can be carried out either during or after one of the sulfurization and neutralization steps and by any method known by a person skilled in the art. Alternatively, sulfurization, neutralization and overbasing can be carried out simultaneously. In general, the overbasing is carried out by reaction with an acidic overbasing compound such as, for example, carbon dioxide or boric acid. In one embodiment, an overbasing process is by way of carbonation, i.e., a reaction with carbon dioxide. Such carbonation can be conveniently effected by addition of solvents such as aromatic solvents, alcohols or polyols, typically an alkylene diol, e.g., ethylene glycol. Conveniently, the reaction is conducted by the simple expedient of bubbling gaseous carbon dioxide through the reaction mixture. Excess solvents and any water formed during the overbasing reaction can be conveniently removed by distillation either during or after the reaction.

In one embodiment, the overbasing reaction is carried out in a reactor by reacting the salt of the sulfurized alkyl-substituted hydroxyaromatic composition with a source of an alkaline earth metal such as lime (i.e., an alkaline earth metal hydroxide) in the presence of carbon dioxide, and in the presence of an aromatic solvent (e.g., xylene), and a hydrocarbyl alcohol such as methanol. Conveniently, the reaction is conducted by the simple expedient of bubbling gaseous carbon dioxide through the reaction mixture. The carbon dioxide may be introduced over a period of about 1 hour to about 3 hours, at a temperature ranging from about 30° C. to about 60° C. The degree of overbasing may be controlled by the quantity of the source of an alkaline earth metal, carbon dioxide and the reactants added to the reaction mixture and the reaction conditions used during the carbonation process.

In another embodiment, the overbasing reaction can be carried out between 140° C. and 180° C. in the presence of a polyol, typically an alkylene diol, e.g., ethylene glycol, and/or alkanols, e.g., $C_6$ to $C_{16}$ alkanols, such as decyl alcohols, 2-ethyl hexanol. Excess solvent and any water formed during the overbasing reaction can be conveniently removed by distillation either during or after the reaction.

The overbased salt of a sulfurized alkyl-substituted hydroxyaromatic composition may have a TBN of from about 50 to about 500.

In general, the resulting neutral or overbased salt of a sulfurized alkyl-substituted hydroxyaromatic composition will contain an amount, by combined mass, of unsulfurized alkyl-substituted hydroxyaromatic compound and its unsulfurized metal salt that will need to be further reduced in order to minimize any potential health risks to customers and to avoid potential regulatory issues. In one embodiment, the resulting neutral or overbased salt of a sulfurized alkyl-substituted hydroxyaromatic composition will ordinarily contain from about 2 to about 10 wt. %, by combined mass, of the unsulfurized alkyl-substituted hydroxyaromatic compound and its unsulfurized metal salt.

In addition, as one skilled in the art would readily understand, the salt of a sulfurized alkyl-substituted hydroxyaromatic composition can contain other components in addition to the unsulfurized alkyl-substituted hydroxyaromatic compound and its unsulfurized metal salt.

In step (b), the unsulfurized alkyl-substituted hydroxyaromatic compound and its unsulfurized metal salt are extracted from the composition of step (a) with one or more solvents capable of solubilizing the unsulfurized alkyl-substituted hydroxyaromatic compound and its unsulfurized metal salt and under extraction conditions sufficient to provide a salt of a sulfurized alkyl-substituted hydroxyaromatic composition having a reduced content of unsulfurized alkyl-substituted hydroxyaromatic compound and its unsulfurized metal salt. In general, one or more solvents capable of solubilizing the unsulfurized alkyl-substituted hydroxyaromatic compound and its unsulfurized metal salt are added to the composition of step (a). Useful solvents include, by way of example, low molecular weight alcohols such as $C_1$ to $C_3$ alcohols, carbonyl-containing compounds such as aldehydes and ketones and the like. Representative examples of low molecular weight alcohols include methanol, ethanol, propanol, isopropanol, and the like and mixtures thereof. In one embodiment, one solvent is used in the extraction step. In another embodiment, a mixture of solvents is used in the extraction step.

Suitable carbonyl-containing compounds include by way of example, aldehydes, ketones and the like and mixtures thereof. Useful aldehydes include $C_1$ to $C_{12}$ aliphatic aldehydes, $C_4$ to $C_{12}$ cycloaliphatic aldehydes, $C_7$ to $C_{12}$ aromatic aldehydes and the like and mixtures thereof. Representative examples of $C_1$ to $C_{12}$ aliphatic aldehydes include formaldehyde, acetaldehyde, proprionaldehyde, butraldehyde, pentanaldehyde, hexanaldehyde, heptanaldehyde, octanaldehyde, nonanaldehyde and the like and mixtures thereof. Representative examples of $C_4$ to $C_{12}$ cycloaliphatic aldehydes include cyclopropyl aldehyde, cyclobutyl aldehyde, cyclopentyl aldehyde and the like and mixtures thereof. Representative examples of $C_7$ to $C_{12}$ aromatic aldehydes include benzaldehyde and the like and mixtures thereof.

Useful ketones include $C_3$ to $C_{12}$ aliphatic ketones, $C_3$ to $C_{12}$ cycloaliphatic ketones, $C_8$ to $C_{12}$ aromatic ketones and the like and mixtures thereof. Representative examples of $C_3$ to $C_{12}$ aliphatic ketones include acetone, butanone (also referred to as methyl ethyl ketone), pentanone, hexanone, heptanone, octanone, nonanone and the like and mixtures thereof. Representative examples of $C_3$ to $C_{12}$ cycloaliphatic ketones include cyclopropyl ketone, cyclobutyl ketone, cyclopentyl ketone and the like and mixtures thereof. Representative examples of $C_8$ to $C_{12}$ aromatic ketones include acetophenone, benzophenone and the like and mixtures thereof.

If desired, one or more co-solvents may also be employed in the process of the present invention. In one embodiment, the one or more co-solvents may be added prior to the addition of the one or more solvents capable of solubilizing the unsulfurized alkyl-substituted hydroxyaromatic compound and its unsulfurized metal salt. In another embodiment, the one or more co-solvents may be added with the one or more solvents capable of solubilizing the unsulfurized alkyl-substituted hydroxyaromatic compound and its unsulfurized metal salt. Useful co-solvents include, by way of example, water and acidic co-solvents and the like and mixtures thereof.

In one embodiment, a suitable acidic co-solvent is a carboxylic acid. Useful carboxylic acids include a saturated or unsaturated carboxylic acid such as a saturated or unsaturated monocarboxylic acid, or a saturated or unsaturated polycarboxylic acid, e.g., a saturated or unsaturated dicarboxylic acid or a saturated or unsaturated tricarboxylic acid. Suitable saturated or unsaturated carboxylic acids include saturated or unsaturated aliphatic monocarboxylic acids, saturated or unsaturated cycloaliphatic monocarboxylic acids, saturated or unsaturated aromatic monocarboxylic acids, saturated or unsaturated aliphatic dicarboxylic acids, saturated or unsaturated cycloaliphatic dicarboxylic acids, saturated or unsaturated aromatic dicarboxylic acids, saturated or unsaturated aliphatic tricarboxylic acids, saturated or unsaturated cycloaliphatic tricarboxylic acids, saturated or unsaturated aromatic tricarboxylic acids and the like.

In one embodiment, a representative saturated or unsaturated carboxylic acid is of the general formula:

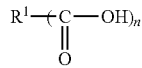

wherein $R^1$ is H or —COOH and n is 1 or $R^1$ is a linear or branched alkyl, alkenyl, cycloalkyl, cycloalkenyl, cycloalkylalkyl, aryl, alkaryl, or aralkyl group, any of which may or may not be substituted with one or more functional groups other than COOH, e.g., hydroxyl group, a substituted or unsubstituted $C_1$ to $C_{30}$ alkyl, a substituted or unsubstituted $C_2$ to $C_{30}$ alkenyl, a substituted or unsubstituted $C_3$ to $C_{30}$ cycloalkyl, a substituted or unsubstituted $C_3$ to $C_{30}$ cycloalkylalkyl, a substituted or unsubstituted $C_3$ to $C_{30}$ cycloalkenyl, a substituted or unsubstituted $C_5$ to $C_{30}$ aryl or a substituted or unsubstituted $C_5$ to $C_{30}$ arylalkyl, and n is 1, 2 or 3.

Suitable aliphatic monocarboxylic acids include a saturated or unsaturated aliphatic monocarboxylic acids having from about 1 to 30 carbon atoms. The aliphatic group can be linear or branched, and can have a substituent such as hydroxyl or an alkoxy group. Examples of aliphatic monocarboxylic acids include, but are not limited to, formic acid, acetic acid, phenylacetic acid, propionic acid, alanine, butyric acid, hydroxybutyric acid, valeric acid, hexanoic acid, heptanoic acid, octanoic acid, nonanoic acid, decanoic acid, 2-methylpropionic acid, 2-methylbutyric acid, 3-methylbutyric acid, 2-methylpentanoic acid, 2-ethylhexanoic acid, 2-propylheptanoic acid, pivalic acid, neononanoic acid, neodecanoic acid, neotridecanoic acid, stearic acid, myristic acid, palmitic acid, linolic acid, linoleic acid, oleic acid, lauric acid, acrylic acid, methacrylic acid, crotonic acid, cinnamic acid, and the like and mixtures thereof.

In one embodiment, a suitable monocarboxylic acid is a $C_4$ to $C_{22}$ linear saturated or unsaturated monocarboxylic acid including, but not limited to, butyric acid, valeric acid, caproic acid, enanthic acid, caprylic acid, pelargonic acid, capric acid, undecylic acid, lauric acid, myristic acid, tridecylic acid, pentadecanoic acid, palmitic acid, margaric acid, stearic acid, arachidic acid, behenic acid, myristoleic acid, oleic acid, arachidonic acid, linoleic acid, and the like and mixtures thereof.

Examples of an aromatic monocarboxylic acid includes benzoic acid, nitrobenzoic acid, monohydroxybenzoic acid such as salicylic, 3-hydroxybenzoic acid and 4-hydroxybenzoic acid, alkylhydroxybenzoic acid, chlorobenzoic acid, methoxybenzoic acid, t-butyl benzoic acid, methylbenzoic acid, and phenyl alkyl acids, for example, phenyl acetic acid, 3-phenyl propionic acid, 4-phenyl butyric acid, 3-(p-chlorophenyl) butanoic acid, and the like and mixtures thereof.

Examples of aliphatic dicarboxylic acid include, but are not limited to, oxalic acid, pimelic acid, suberic acid, azelaic acid, sebacic acid, malonic acid, succinic acid, glutaric acid, adipic acid, maleic acid and fumaric acid. Examples of aromatic dicarboxylic acids include, but are not limited to, phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid, 2,6-naphthalene dicarboxylic acid, traumatic acid, muconic acid (double unsaturation) and the like and mixtures thereof.

Examples of polycarboxylic acids such as tricarboxylic acids include, but are not limited to, citric acid, isocitric acid, aconitic acid (unsaturated), carbalyllic acid mellitic (benzenehexacarboxylic) acid and the like and mixtures thereof.

In one embodiment, a suitable acidic co-solvent includes polyalkenyl succinic acids or anhydrides thereof. In general, polyalkenyl succinic acids or anhydrides thereof are the reaction product of a polyalkenyl reactant and an unsaturated acidic reagent. The polyalkenyl succinic acid or anhydride can be formed, for example, the chlorination reaction process or the thermal reaction process.

The polyalkenyl reactant is a polyalkene that can be a polymer of a single type of olefin or it can be a copolymer of two or more types of olefins. The principal sources of the polyalkenyl radical include olefin polymers, particularly polymers made from mono-olefins having from 2 to about 30 carbon atoms. Especially useful are the polymers of 1-mono-olefins such as ethylene, propene, 1-butene, and isobutene. Polymers of isobutene are preferred.

The polyalkenyl substituent of the succinic compound can have a number average molecular weight of about 350 to 5000. In one embodiment, the polyalkenyl substituent can have a number average molecular weight of from about 700 to 3000. In one embodiment, the polyalkenyl substituent can have a number average molecular weight from about 900 to about 2500. In one embodiment, the polyalkenyl substituent can have a number average molecular weight of about 1000. In one embodiment, the polyalkenyl substituent can have a number average molecular weight of about 2300. The most common sources of these polyalkenes are the polyolefins such as polyethylene, polypropylene, polyisobutene, etc.

The unsaturated acidic reagent for use in reacting with the foregoing polyalkenyl reactant can be any ethylenically unsaturated carboxylic acid or source of carboxylic acid functionality. These reactants typically contain at least one ethylenic bond and at least one and preferably two carboxylic acid groups, an anhydride group or a polar group which is convertible into a carboxylic acid group by oxidation or hydrolysis. In one embodiment, the unsaturated acidic reagent can be a maleic or fumaric reagent of the general formula:

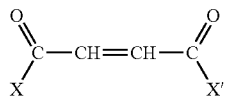

wherein X and X' are the same or different, provided that at least one of X and X' is a group that is capable of reacting to esterify alcohols, form metal salts with reactive metals or basically reacting metal compounds and otherwise function as acylating agents. Typically, X and X' comprise functional groups that may comprise one or more of —OH; —O—$R_3$ wherein $R_3$ is a lower alkyl of 1 to 6 carbon atoms; or taken together X and X' may be —O— so as to form an anhydride. Preferably, X and X' are such that both carboxylic functions can enter into acylation reactions. Suitable unsaturated acidic reagents include, but are not limited to, electron-deficient olefins such as maleic anhydride, maleic acid, maleic acid monoesters and diesters, fumaric acid, and fumaric acid monoesters and diesters.

In one embodiment, a suitable acidic co-solvent includes organic sulfonic acids such as aliphatic sulfonic acids, aromatic sulfonic acids and the like and mixtures thereof. Suitable aliphatic sulfonic acids include $C_1$ to $C_{20}$ aliphatic sulfonic acids such as an alkylsulfonic acid having 1 to 6 carbon atoms, for example, methanesulfonic acid, ethanesulfonic acid, propanesulfonic acid, butansulfonic acid, pentanesulfonic acid, hexanesulfonic acid and like and mixtures thereof. Suitable aromatic sulfonic acids include aromatic sulfonic acids having 6 to 10 carbon atoms and alkyl aromatic sulfonic acids having 6 to 40 carbon atoms such as, for example, benzenesulfonic acid, naphthalenesulfonic acid, p-toluenesulfonic acid, p-methoxybenzenesulfonic acid and like and mixtures thereof.

In one embodiment, a suitable acidic co-solvent includes amine or ammonium salts such as ammonium acetate.

In one embodiment, a suitable acidic co-solvent can be a peroxide such as hydrogen peroxide.

Generally, an effective amount of the one or more co-solvents is an amount ranging from about 1 wt. % to about 25 wt. %, based on the total amount of the salt of a sulfurized alkyl-substituted hydroxyaromatic composition.

Extracting the solubilized unsulfurized alkyl-substituted hydroxyaromatic compound and its unsulfurized metal salt from the composition of step (a) can be carried employing any known extracting technique to provide a salt of a sulfurized alkyl-substituted hydroxyaromatic composition having a reduced content of unsulfurized alkyl-substituted hydroxyaromatic compound and its unsulfurized metal salt. Extraction can be carried out at room temperature or at a temperature ranging from 30° C. to about 200° C. In one embodiment, extraction of the unsulfurized alkyl-substituted hydroxyaromatic compound and its unsulfurized metal salt with the one or more solvents is carried out at an elevated temperature with the use of a pressure vessel. The number of extractions will necessarily depend on the solvent(s) used as well as the concentration of solvent(s) to provide a salt of a sulfurized alkyl-substituted hydroxyaromatic composition having a reduced content of unsulfurized alkyl-substituted hydroxyaromatic compound and its unsulfurized metal salt. Generally, a suitable concentration of solvent(s) can range from weight ratio of solvent to composition of about 20:80 to about 80:20.

If desired, prior to extraction, one or more non-polar solvents can be added to the composition to dissolve or dilute the composition followed by extraction. Suitable non-polar solvent include, by way of example, alkane solvents such as hexane, pentane and the like, aromatic solvents such as toluene, xylene and the like, and mixtures thereof.

The resulting extracted neutral or overbased salt of a sulfurized alkyl-substituted hydroxyaromatic composition will be substantially free of the unsulfurized alkyl-substituted hydroxyaromatic compound and its unsulfurized metal salt. The term "substantially free" as used herein means relatively low levels, if any, of the unsulfurized alkyl-substituted hydroxyaromatic compound and its unsulfurized metal salt which remains after the step (b), e.g., less than about 1.5 wt. %, or less than about 0.3 wt. %. In one embodiment, the term "substantially free" ranges from about 0.1 to less than about 1.5 wt. %. In another embodiment, the term "substantially free" ranges from about 0.1 to less than about 1 wt. %. In another embodiment, the term "substantially free" ranges from about 0.1 to about 0.3 wt. %.

Optionally, an inert liquid medium, such as a diluent oil or a lubricant base oil, may then be added to the resulting reaction mixture to reduce the viscosity of the reaction mixture and/or disperse the product. Suitable diluent oils are known in the art, and are defined, for example, in FUELS AND LUBRICANTS HANDBOOK, (George E. Totten, ed., (2003)) at page 199, as "base fluids . . . of mineral origin, synthetic chemical origin or biological origin."

The resulting neutral or overbased salt of the sulfurized alkyl-substituted hydroxyaromatic composition is advantageously employed in a lubricating oil composition containing at least a major amount of an oil of lubricating viscosity. The lubricating oil compositions may also contain other conventional additives that can impart or improve any desirable property of the lubricating oil composition in which these additives are dispersed or dissolved. Any additive known to a person of ordinary skill in the art may be used in the lubricating oil compositions disclosed herein. Some suitable additives have been described in Mortier et al., "Chemistry and Technology of Lubricants," 2nd Edition, London, Springer, (1996); and Leslie R. Rudnick, "Lubricant Additives: Chemistry and Applications," New York, Marcel Dekker (2003), both of which are incorporated herein by reference. For example, the lubricating oil compositions can be blended with antioxidants, anti-wear agents, detergents such as metal detergents, rust inhibitors, dehazing agents, demulsifying agents, metal deactivating agents, friction modifiers, pour point depressants, antifoaming agents, co-solvents, package compatibilisers, corrosion-inhibitors, ashless dispersants, dyes, extreme pressure agents and the like and mixtures thereof. A variety of the additives are known and commercially available. These additives, or their analogous compounds, can be employed for the preparation of the lubricating oil compositions of the invention by the usual blending procedures.

The following non-limiting examples are illustrative of the present invention.

In the examples, the following abbreviations are used.

IPA—Isopropyl alcohol
MeOH—methanol
EtOH—ethanol
HOAc—Acetic acid

The concentration of total unsulfurized alkylhydroxyaromatic compound and its unsulfurized metal salt in the salt of a sulfurized alkyl-substituted hydroxyaromatic composition (i.e., "total TPP" or "total residual TPP") as disclosed herein and exemplified below, as well as lubricants and oil additives containing salts of a sulfurized alkyl-substituted hydroxyaromatic composition is determined by reverse phase High Performance Liquid Chromatography (HPLC). In the HPLC method, samples were prepared for analysis by weighing accurately 80 to 120 mg of sample into a 10 ml volumetric flask, diluting to the level mark with methylene chloride, and mixing until the sample is fully dissolved.

The HPLC system used in the HPLC method included a HPLC pump, a thermostatted HPLC column compartment, HPLC fluorescence detector, and PC-based chromatography data acquisition system. The particular system described is based on an Agilent 1200 HPLC with ChemStation software. The HPLC column was a Phenomenex Luna C8(2) 150×4.6 mm 5 μm 100 Å, P/N 00F4249E0.

The following system settings were used in performing the analyses:

Pump flow=1.0 ml/min
Maximum pressure=200 bars
Fluorescence wavelength: 225 excitation 313 emission: Gain:=9
Column Thermostat temperature=25 C.
Injection Size=1 μL of diluted sample
Elution type: Gradient, reverse phase
Gradient: 0-7 min 85/15 methanol/water switching to 100% methanol linear gradient.
Run time: 17 minutes The resulting chromatograph typically contains several peaks. Peaks due to the free unsulfurized alkylhydroxyaromatic compound typically elute together at early retention times; whereas peaks due to sulfurized alkylhydroxyaromatic compounds typically elute at longer retention times. For purposes of quantitation, the area of the single largest peak of the free unsulfurized alkylhydroxyaromatic compound and its unsulfurized metal salt was measured, and then that area was used to determine the concentration of the total free unsulfurized alkylhydroxyaromatic compound and its unsulfurized metal salt species. The assumption is that the speciation of alkylhydroxyaromatic compounds does not change; if something does change the speciation of the alkylhydroxyaromatic compounds, then recalibration is necessary.

The area of the chosen peak is compared to a calibration curve to arrive at the wt-% of free alkylphenol and free unsulfurized salts of alkylphenols. The calibration curve was developed using the same peak in the chromatograph obtained for the free unsulfurized alkylhydroxyaromatic compound used to make the phenate product.

Example

General procedures for solvent extraction of sulphurized overbased metal phenate detergent.

The sulphurized overbased metal phenate detergent is a composition comprising (i) a salt of a sulfurized alkyl-substituted hydroxyaromatic compound; (ii) an unsulfurized alkyl-substituted hydroxyaromatic compound and (iii) an unsulfurized metal salt of the alkyl-substituted hydroxyaromatic compound; wherein the alkyl-substituted hydroxyaromatic compound is derived from alkylation of a hydroxyaromatic compound with one or more olefins comprising $C_9$ to $C_{18}$ oligomers of monomers selected from propylene, butylene or mixtures thereof.

Two methods of solvent extraction were employed. Method one (1) involved the use of the co-solvent hexane to dissolve the sulphurized overbased metal phenate detergent (nominally TBN=260, containing 7.1% total TPP by HPLC analysis) prior to extraction and method two (II) the sulphurized overbased metal phenate detergent was extracted directly with the solvent. In a typical experiment using the first extraction method (1), approximately equal weight of the sulphurized overbased metal phenate detergent was dissolved in approximately equal weight of hexane and the mixture was extracted with the extraction solvent in a separatory funnel at room temperature. Following the desired number of extractions, the hexane layer was concentrated by removing the hexane to afford the extracted composition. In a typical experiment using the second extraction method (II), to approximately 10 grams of sulphurized overbased metal phenate detergent (nominally TBN=260, containing 7.1% total TPP by HPLC analysis) in a 50 ml pressure vessel fitted with a heating mantle, temperature controller, thermocouple, mechanical agitator, pressure gauge and a valve was added about 23 grams of the extraction solvent. The pressure vessel was sealed and heated to the desired temperature with full agitation for about 15 minutes. The agitation was stopped and pressure vessel was then cooled to about 25 deg C. and the extraction solvent removed.

Following the desired number of extractions, the extracted composition was removed from the pressure vessel and any remaining extraction solvent in the composition was removed to afford the final extracted composition. In both extraction methods, it was sometimes necessary to add a diluent base oil to the extracted composition to maintain tractability. The TBN and total TPP of the extracted composition were then measured and the total TPP was measured by the reported HPLC method and corrected to 260 TBN.

Using the general procedures discussed above, the following examples were carried out as set forth in Table 1 below.

TABLE I

| Extraction Temp. (° C.) | Number of Extractions | Extraction Solvent(s) and Extraction Method (I) OR (II) | Wt. Ratio of Composition to Extraction Solvent (%) | Total TPP (wt. %) |
|---|---|---|---|---|
| RT | 3 | Methanol (I) | 50:50 | 3.2 |
| RT | 3 | 0.1 wt. % Acetic Acid in Methanol (I) | 50:50 | 2.4 |
| RT | 3 | 0.5 wt. % Acetic Acid in Methanol (I) | 50:50 | 1.6 |
| RT | 3 | 1 wt. % Acetic Acid in Methanol (I) | 50:50 | 1.1 |
| RT | 1 | Isopropanol (I) | 50:50 | 2.4 |

TABLE I-continued

| Extraction Temp. (° C.) | Number of Extractions | Extraction Solvent(s) and Extraction Method (I) OR (II) | Wt. Ratio of Composition to Extraction Solvent (%) | Total TPP (wt. %) |
|---|---|---|---|---|
| RT | 3 | Sequential Extraction - All Extraction Method (I) First Extraction Solvent: 1.2 wt % Acetic Acid + 11.1 wt. % H2O + 87.7 wt. % Isopropanol Second Extraction Solvent: 0.7 wt. % Acetic Acid + 99. wt. % Isopropanol Third Extraction Solvent: 0.3 wt % Acetic Acid + 99.7 wt % Isopropanol | 50:50 | 0.2 |
| 80° C. | 3 | 1 wt. % Acetic Acid in Methanol (II) | 61:39 | 1.2 |
| 120° C. | 3 | 1 wt. % Acetic Acid in Methanol (II) | 61:39 | 1.2 |
| 120° C. | 3 | Sequential Extraction - All Extraction Method (II) First Extraction: 1 wt. % Acetic Acid in Methanol Second Extraction: 0.5 wt % Acetic Acid in Methanol Third Extraction: 100% Methanol | 39:61 | 0.7 |
| 80° C. | 3 | 5 wt. % H$_2$O in Methanol (II) | 39:61 | 0.5 |
| 120° C. | 3 | 5 wt. % H$_2$O in Methanol (II) | 39:61 | 0.6 |
| 120° C. | 3 | Methanol (II) | 39:61 | 0.6 |
| 100° C. | 3 | Methanol (II) | 39:61 | 0.9 |
| 80° C. | 3 | Methanol (II) | 39:61 | 1.1 |
| 80° C. | 3 | 1 wt. % H$_2$O in Methanol (II) | 39:61 | 0.8 |
| 100° C. | 3 | Methanol (II) | 39:61 | 1.1 |
| 80° C. | 3 | 5% H$_2$O in Methanol (II) | 39:61 | 0.4 |
| 80° C. | 1 | Methanol (II) | 39:61 | 2.6 |
| 80° C. | 2 | Methanol (II) | 39:61 | 1.8 |
| 80° C. | 3 | Methanol (II) | 39:61 | 1.0 |
| 80° C. | 6 | Methanol (II) | 39:61 | 0.5 |

In the following examples, the reactions were performed in a round bottom flask equipped with a magnetic stirrer under open air atmosphere. The results of the examples are set forth below in Table 2.

Example 1

To 598 mg of a sulphurized overbased metal phenate detergent (7.4 wt. % of residual TPP, determined by HPLC method) was added dropwise, at room temperature, 3 mL (2.4 g) of acetone. After stirring overnight at room temperature, the reaction mixture was decanted and the detergent phase was dried under low pressure vacuum (5-10 mm/Hg) at room temperature to remove the residual acetone before being submitted for HPLC analysis. A product with 1.25 wt. % of residual total alkylphenol (after base oil loss adjustment) was obtained. The weight ratio of composition:solvent used in this example was 20/80.

Example 2

According to the general procedure described in Example 1, 583 mg of the sulphurized overbased metal phenate detergent used in Example 1 was reacted with 5 mL (3.95 g) of ethyl alcohol, to afford a product with 4.4 wt. % of residual total alkylphenol (after base oil adjustment, as determined by HPLC). The weight ratio of composition:solvent used in this example was 15/85.

Example 3

According to the general procedure described in Example 1, 800 mg of the sulphurized overbased metal phenate detergent used in Example 1 was reacted with 5 mL of methyl ethyl ketone (4 g), to afford a product with 6.83 wt. % of residual total alkylphenol (after base oil adjustment, as determined by HPLC). The weight ratio of composition:solvent used in this example was 17/83.

Example 4

6.5 g of the sulphurized overbased metal phenate detergent used in Example 1, and following the procedure in Example 1, was reacted with 183 mg (2.8 wt. % of the total reactant weight) of glacial acetic acid and subsequently extracted 3 times 15 minutes with 40 mL of ethanol each time (HPLC grade), to afford a product with 4.3 wt. % of residual total alkylphenol (after base oil adjustment, as determined by HPLC). The weight ratio of composition:solvent used in this example was 3/97.

Example 5

The acid-treated sulphurized overbased metal phenate detergent used in Example 4 was extracted twice at 60° C. for 1 h with 20 mL (15.8 g) of ethanol each time, to afford a product with 0.04 wt. % of residual total alkylphenol (after base oil adjustment, as determined by HPLC). The weight ratio of composition:solvent used in this example was 29/61.

Example 6

1.81 g of the acid-treated sulphurized overbased metal phenate detergent used in Example 4 was extracted twice at 60° C. for 40 min with 20 mL (15.8 g) of ethanol each time, to afford a product with 0.43 wt. % of residual total alkylphenol (after base oil adjustment, as determined by HPLC). The weight ratio of composition:solvent used in this example was 10/90.

Example 7

According to the procedure described in Example 6, 15.35 g of the sulphurized overbased metal phenate detergent used in Example 1 was reacted with 434 mg (2.7 wt. % of the total reactant weight) of glacial acetic acid. 1.83 g of this acid treated detergent was subsequently extracted for 1 h at 60° C. twice with 20 mL of methanol each time (HPLC grade), to afford a product with 0.17 wt. % of residual total alkylphenol (after base oil adjustment, as determined by HPLC). The weight ratio of composition:solvent used in this example was 10/90.

TABLE 2

| Extraction Temp. (° C.) | Number of Extractions | Extraction Solvent(s) | Wt. Ratio of Composition and Extraction Solvent (%) | Total TPP (wt. %) |
|---|---|---|---|---|
| RT | 1 × 12 h | Acetone | 23:77 | 1.93 |
| RT | 1 × 12 h | EtOH | 15:85 | 2.61 |
| RT | 1 × 12 h | Methyl Ethyl ketone | 17:83 | 6.83% |
| RT | 3 × 0.25 h | EtOH, Acetic acid (2.8 wt. %) | 3:97 | 4.3% |
| 60° C. | 2 × 1 h | EtOH, Acetic acid (2.8 wt. %) | 29:61 | 0.04% |
| 60° C. | 2 × 40 min | EtOH, Acetic acid (2.8 wt. %) | 10:90 | 0.43% |
| 60° C. | 3 | MeOH, Acetic acid (2.8 wt. %) | 10:90 | 0.17% |

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A process for preparing a salt of a sulfurized alkyl-substituted hydroxyaromatic composition having a reduced content of unsulfurized alkyl-substituted hydroxyaromatic compound and its unsulfurized metal salt, the process comprising the steps of:
    (a) providing a composition comprising (i) a salt of a sulfurized alkyl-substituted hydroxyaromatic compound; (ii) an unsulfurized alkyl-substituted hydroxyaromatic compound and (iii) an unsulfurized metal salt of the alkyl-substituted hydroxyaromatic compound; wherein the alkyl-substituted hydroxyaromatic compound is derived from alkylation of a hydroxyaromatic compound with one or more olefins comprising $C_9$ to $C_{18}$ oligomers of monomers selected from propylene, butylene or mixtures thereof; and
    (b) extracting the unsulfurized alkyl-substituted hydroxyaromatic compound and its unsulfurized metal salt from the composition of step (a) with one or more solvents capable of solubilizing the unsulfurized alkyl-substituted hydroxyaromatic compound and its unsulfurized metal salt and under extraction conditions sufficient to provide a salt of a sulfurized alkyl-substituted hydroxyaromatic composition having a reduced content of unsulfurized alkyl-substituted hydroxyaromatic compound and its unsulfurized metal salt.

2. The process of claim 1, wherein the composition provided in step (a) is obtained by a process comprising (i) alkylating a hydroxyaromatic compound with one or more olefins comprising $C_9$ to $C_{18}$ oligomers of monomers selected from propylene, butylene or mixtures thereof, to provide an alkyl-substituted hydroxyaromatic compound; (ii) sulfurizing and neutralizing the alkyl-substituted hydroxyaromatic compound in any order to provide a salt of a sulfurized alkyl-substituted hydroxyaromatic composition; and (iii) optionally overbasing the salt of a sulfurized alkyl-substituted hydroxyaromatic composition.

3. The process of claim 1, wherein the unsulfurized alkyl-substituted hydroxyaromatic compound is a tetrapropenyl phenol.

4. The process of claim 1, wherein the one or more solvents capable of solubilizing the unsulfurized alkyl-substituted hydroxyaromatic compound and its unsulfurized metal salt is selected from the group consisting of a low molecular weight alcohol, a carbonyl containing compound and mixtures thereof.

5. The process of claim 4, wherein the low molecular weight alcohol is selected from the group consisting of methanol, ethanol, propanol, isopropanol, and mixtures thereof.

6. The process of claim 4, wherein the carbonyl-containing compound is selected from the group consisting of an aldehyde, ketone, and mixtures thereof.

7. The process of claim 6, wherein the aldehyde is selected from the group consisting of a $C_1$ to $C_{12}$ aliphatic aldehyde, $C_4$ to $C_{12}$ cycloaliphatic aldehyde, $C_7$ to $C_{12}$ aromatic aldehyde and mixtures thereof.

8. The process of claim 6, wherein the ketone is selected from the group consisting of a $C_3$ to $C_1$, aliphatic ketone, $C_3$ to $C_{12}$ cycloaliphatic ketone, $C_8$ to $C_{12}$ aromatic ketone and mixtures thereof.

9. The process of claim 1, further comprising adding one or more co-solvents prior to or with the addition of the one or more solvents capable of solubilizing the unsulfurized alkyl-substituted hydroxyaromatic compound and its unsulfurized metal salt.

10. The process of claim 9, wherein the one or more co-solvents is selected from the group consisting of water, acidic co-solvent and mixtures thereof.

11. The process of claim 10, wherein the one or more acidic co-solvents is selected from the group consisting of a carboxylic acid, a polyalkenyl succinic acid or anhydride thereof, an organic sulfonic acid, an amine or ammonium salt, a peroxide and mixtures thereof.

12. The process of claim 11, wherein the carboxylic acid is selected from the group consisting of a saturated or unsaturated monocarboxylic acid, a saturated or unsaturated polycarboxylic acid and mixtures thereof.

13. The process of claim 11, wherein the polyalkenyl succinic acid or anhydride thereof is a reaction product of a polyalkenyl reactant and an unsaturated acidic reagent.

14. The process of claim 11, wherein the organic sulfonic acid is selected from the group consisting of a aliphatic sulfonic acid, aromatic sulfonic acid and mixtures thereof.

15. The process of claim 1, wherein the extraction conditions include room temperature or at a temperature ranging from 30° C. to about 200° C.

16. The process of claim 1, further comprising the step of adding one or more non-polar solvents to the composition provided in step (a) to dissolve or dilute the composition prior to extraction step (b).

17. The process of claim 16, wherein the one or more non-polar solvents is selected from the group consisting of an alkane solvent, aromatic solvent and mixtures thereof.

18. The process of claim 1, wherein the resulting extracted salt of a sulfurized alkyl-substituted hydroxyaromatic composition is from about 0.1 wt. % to about 1.5 wt. % of the unsulfurized alkyl-substituted hydroxyaromatic compound and its unsulfurized metal salt.

19. The process of claim 1, wherein the resulting extracted salt of a sulfurized alkyl-substituted hydroxyaromatic composition contains less than about 0.3 wt. % of the unsulfurized alkyl-substituted hydroxyaromatic compound and its unsulfurized metal salt.

20. The process of claim 1, further comprising adding an inert liquid medium to the resulting salt of a sulfurized alkyl-substituted hydroxyaromatic composition having a reduced content of unsulfurized alkyl-substituted hydroxyaromatic compound and its unsulfurized metal salt.

* * * * *